United States Patent [19]

Beckert

[11] 4,207,821

[45] Jun. 17, 1980

[54] MONORAIL CONVEYOR

[75] Inventor: Reiner Beckert, Esslingen, Fed. Rep. of Germany

[73] Assignee: Bleitchert Förderanlagen GmbH, Osterburken, Fed. Rep. of Germany

[21] Appl. No.: 943,613

[22] Filed: Sep. 19, 1978

[30] Foreign Application Priority Data

Sep. 29, 1977 [LU] Luxembourg .............................. 78204

[51] Int. Cl.² .............................................. B61B 13/06
[52] U.S. Cl. ..................................... 104/119; 104/106; 104/130; 105/29 R; 105/144
[58] Field of Search ............................... 104/106–108, 104/94, 89, 118–120, 130, 132; 105/29 R, 141, 144, 145, 148, 155

[56] References Cited

U.S. PATENT DOCUMENTS

| | | | |
|---|---|---|---|
| 3,012,519 | 12/1961 | Bingham | 104/120 |
| 3,550,535 | 12/1970 | Rooklyn | 104/118 |
| 3,800,707 | 4/1974 | Hermann | 104/94 |
| 3,974,777 | 8/1976 | Monne | 104/94 |
| 4,094,252 | 6/1978 | Peter et al. | 104/130 |

FOREIGN PATENT DOCUMENTS

516865 9/1955 Canada ...................................... 104/107

*Primary Examiner*—John J. Love
*Assistant Examiner*—Ross Weaver
*Attorney, Agent, or Firm*—Peter K. Kontler

[57] ABSTRACT

An overhead monorail conveyor whose inverted U-shaped rail has flanges provided with inwardly extending lower marginal portions to provide tracks for the wheels of a vehicle having an inverted U-shaped frame which surrounds a portion of the rail. The wheels are mounted on brackets which extend at a level below the marginal portions of the flanges and thereupon upwardly into the interior of the vehicle frame. The motor which drives the vehicle is mounted in the frame in the interior of the rail, the same as the conductors which supply electrical energy and the toothed rack or racks which mate with several gears driven by the motor. The interior of the rail further confines and shields other sensitive components of the conveyor, such as electric switches, proximity detectors, contacts which slide along bus bars, centering rolls for the frame of the vehicle, and devices for biasing the motor-driven gears against the toothed racks.

17 Claims, 7 Drawing Figures

MONORAIL CONVEYOR

BACKGROUND OF THE INVENTION

The present invention relates to conveyor systems in general, and more particularly to improvements in conveyors of the type wherein a trolley, a telpher, a cage, a gondola or another suitable vehicle or conveyance is confined to movement along a single rail.

A drawback of presently known monorail conveyors is that many sensitive parts of the conveyance (i.e., of the vehicle which moves along a rail, normally an overhead rail) are exposed and are subjected to the influence of dust or other foreign matter. Furthermore, exposure of certain parts in electrically powered vehicles is dangerous to attendants, e.g., when the monorail system is used in the assembly hall, magazine or another section of a manufacturing or like plant. As a rule, the vehicle is mounted for travel along an I-shaped rail. It is also known to employ U-shaped rails wherein the web is located at the lower ends of the flanges, i.e., the rail is open at its upper side so that all descending foreign matter can accumulate in its interior to interfere with movements of the vehicle if the latter comprises parts which extend upwardly along the outer sides of the flanges and thereupon downwardly into the interior of the rail.

In most instances, the vehicles are driven by electrically powered motors which transmit torque to gears in mesh with stationary toothed racks which are secured to the rails. Such construction of driving means is satisfactory, except that the motor, the gear and/or the rack is likely to be contaminated by dust or other foreign matter to thus interfere with predictable movement of vehicles along the rails.

OBJECTS AND SUMMARY OF THE INVENTION

An object of the invention is to provide a novel and improved monorail conveyor which is constructed and assembled in such a way that it can stand long periods of use with a minimum of maintenance even if its parts are installed in an area wherein they are exposed to dust, water or other types of moisture, falling rigid objects and the like.

Another object of the invention is to provide the monorail conveyor with a novel and improved rail which not only supports but also shields the conveyances (or at least the sensitive parts of the conveyances) from dust, falling heavy objects and/or other undesirable influences.

A further object of the invention is to provide the conveyor with a novel and improved conveyance and with novel and improved means for mounting the conveyance on the rail.

An additional object of the invention is to provide the conveyor with novel and improved means for driving conveyances along a rail of the above outlined character.

Another object of the invention is to provide a versatile overhead monorail conveyor which can be used indoors or outdoors, which can be automated, either fully or in part, and which can be used for transport and/or other treatment of blanks, semifinished products, finished products or the like.

An additional object of the invention is to provide novel and improved means for preventing excessive or unnecessary frictional engagement between the rail or rails and the conveyance or conveyances of an overhead monorail conveyor.

The invention is embodied in a monorail conveyor which comprises an inverted U-shaped rail including a substantially horizontal web and two downwardly extending flanges having inwardly extending lower marginal portions whose upper sides preferably constitute two elongated tracks, support means for maintaining the rail at a predetermined level above the ground and including one or more upper end portions (e.g., horizontal crossheads disposed transversely of the rail) extending from below into the interior of and secured to the rail (such end portions may be secured to the web and/or to the flanges of the rail), a conveyance including an inverted U-shaped frame or chassis surrounding a portion of the rail (i.e., the frame surrounds portions of the upper side of the web and portions of the outer sides of the flanges) and having suitably configurated bearing portions or brackets extending below the marginal portions of the flanges and upwardly into the interior of the rail to rotatably mount wheels which are located in the interior of the rail and engage the marginal portions of the flanges (the wheels are preferably mounted for rolling movement along the aforementioned tracks of such marginal portions), and means for driving the conveyance along the rail. The driving means may comprise a prime mover (preferably a reversible electric motor) which is located in the interior of the rail and is secured to the conveyance, at least one gear which is driven by the prime mover, and a stationary toothed rack located in the interior of the rail and meshing with the gear. The rack can be secured to the support means or directly to the rail.

The conveyor preferably further comprises centering means which serves to maintain the frame of the conveyance out of contact with the rail. Such centering means may include the aforementioned wheels and preferably further comprises rolls rotatably mounted on or in the bearing portions of the frame and engaging the marginal portions of the flanges. In accordance with a presently preferred embodiment of the conveyor, the rolls are rotatable about substantially vertical axes and roll along substantially vertical edge faces of the marginal portions of the flanges; such edge faces flank an inlet to the interior of the rail.

It is preferred to articulately connect the prime mover to the frame of the conveyance, e.g., by means of several links, and to provide one or more springs or other suitable means for biasing the prime mover in a direction to maintain the gear or gears in mesh with the toothed rack. The prime mover preferably drives several gears which are spaced apart from each other, as considered in the longitudinal direction of the rail; each such gear is directly or indirectly driven by the prime mover and each thereof meshes with the rack. Such arrangement is preferred when the rack is interrupted, i.e., one of the gears remains in mesh with the rack ahead of or behind the interruption while the other gear or gears travel across the gap between neighboring portions of the interrupted rack.

The novel features which are considered as characteristic of the invention are set forth in particular in the appended claims. The improved conveyor itself, however, both as to its construction and its mode of operation, together with additional features and advantages thereof, will be best understood upon perusal of the following detailed description of certain specific em-

DESCRIPTION OF THE PREFERRED EMBODIMENTS

Figure 1:
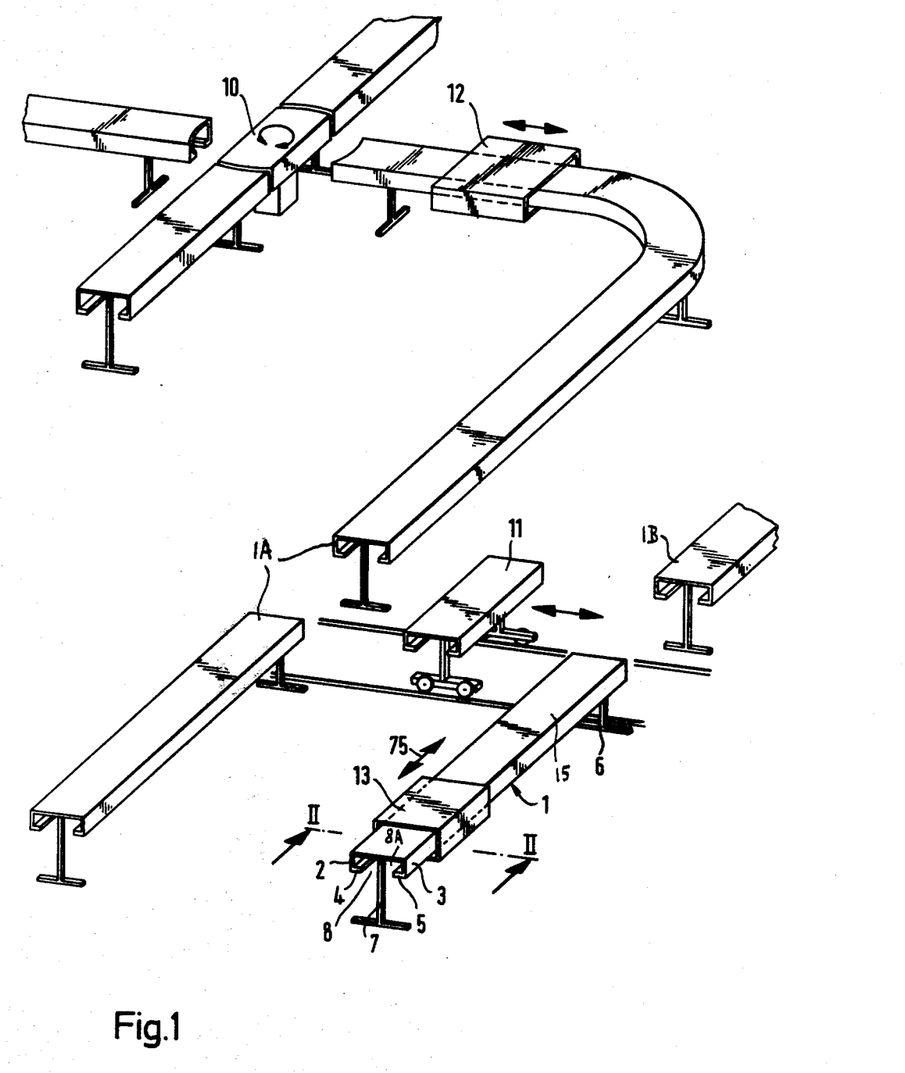
FIG. 1 is a somewhat schematic perspective view of a monorail conveyor which embodies one form of the invention.

Referring first to FIG. 1, there is shown a portion of an overhead monorail conveyor which embodies one form of the invention. The conveyor comprises several inverted U-shaped rails 1 each of which has a substantially horizontal plate-like central section or web 15 and two downwardly extending lateral sections or flanges 2 and 3. In accordance with a feature of the invention, the flanges 2 and 3 are respectively provided with inwardly extending lower marginal portions 4 and 5 which define a relatively narrow inlet 8 to the interior 8A of the rail 1. The just described profile is identical for each and every rail of FIG. 1, regardless of whether or not the rails are straight, arcuate or partly straight and partly arcuate.

The support means for maintaining the rails at a predetermined level above the ground comprises a plurality of upright columns, e.g., in the form short I-bars, the upper end portions of which extend into the interior 8A of the respective rail and are secured to the respective web 15 and/or to the respective flange 2 and/or 3. The straight rail 1 which is shown in the lower right-hand portion of FIG. 1 is mounted on the upper end portions of two spaced-apart columns 6 and 7 whose bases are secured to the ground. However, it is equally possible to employ substantially elbow-shaped support means which are secured to the walls in the hall of a manufacturing plant or the like.

The conveyor of FIG. 1 is a relatively complex system which includes crossing rails (see the upper left-hand portion of FIG. 1) with a turntable 10 at the crossing to allow for transfer of conveyances 12, 13 (and/or others which are not shown in FIG. 1) from one to the other of the rails or vice versa in a manner which will be readily understood by looking at FIG. 1. The conveyor system further comprises a relatively short rail section 11 which is movable sideways into the gap of the one or the other of two parallel rails and is long enough to support at least one conveyance (e.g., the conveyance 13) so that the latter can be caused to move along the rail 1A or along the rail 1 and its extension 1B. Still further, the conveyor system of FIG. 1 may comprise one or more switches, branches and like components which enable one or more conveyances to advance into selected regions of an assembly hall in a manufacturing plant or the like. The exact nature of such components forms no part of the present invention.

Figure 2:
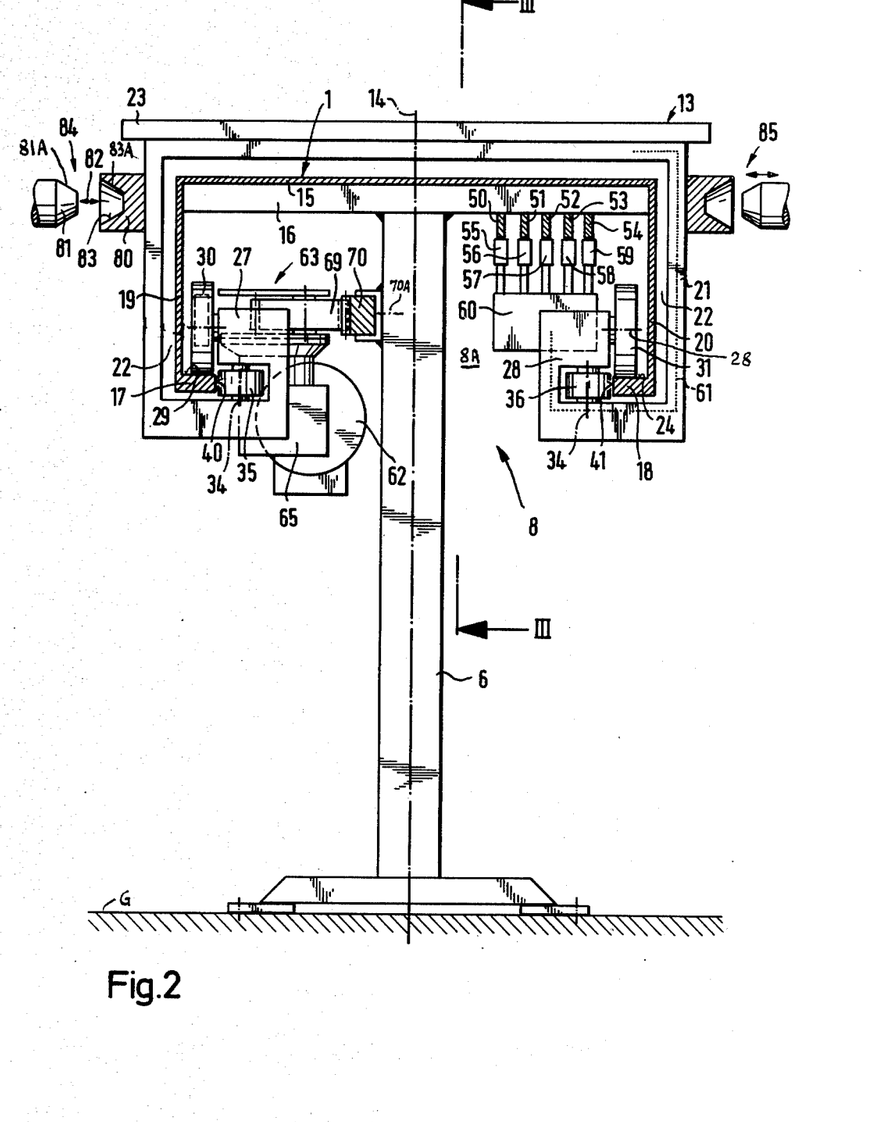
FIG. 2 is an enlarged transverse vertical sectional view as seen in the direction of arrows from the line II—II of FIG. 1, there being shown a rail, a support for the rail, a conveyance on the rail and a driving unit for the conveyance.

Each of the conveyances 12, 13 comprises an inverted U-shaped chassis or frame (see the frame 21 of FIG. 2) which spacedly surrounds the upper side of the web 15 and the outer (exposed) sides of the flanges 2 and 3 of the respective rail 1. The sensitive parts of the conveyances 12, 13 are located in the interior of the respective rails (this is shown in FIG. 2) so that they are shielded from dust, falling objects, oil droplets, water sprays or the like. Since the chassis of each conveyance follows (either closely or approximately) the outline of the respective rail, the exposed parts of the conveyances extend only slightly beyond the respective rails so that they occupy a minimum of space. The inwardly extending lower marginal portions 4 and 5 (along which the wheels of the conveyances travel) are also shielded from dust or the like.

Figure 3:
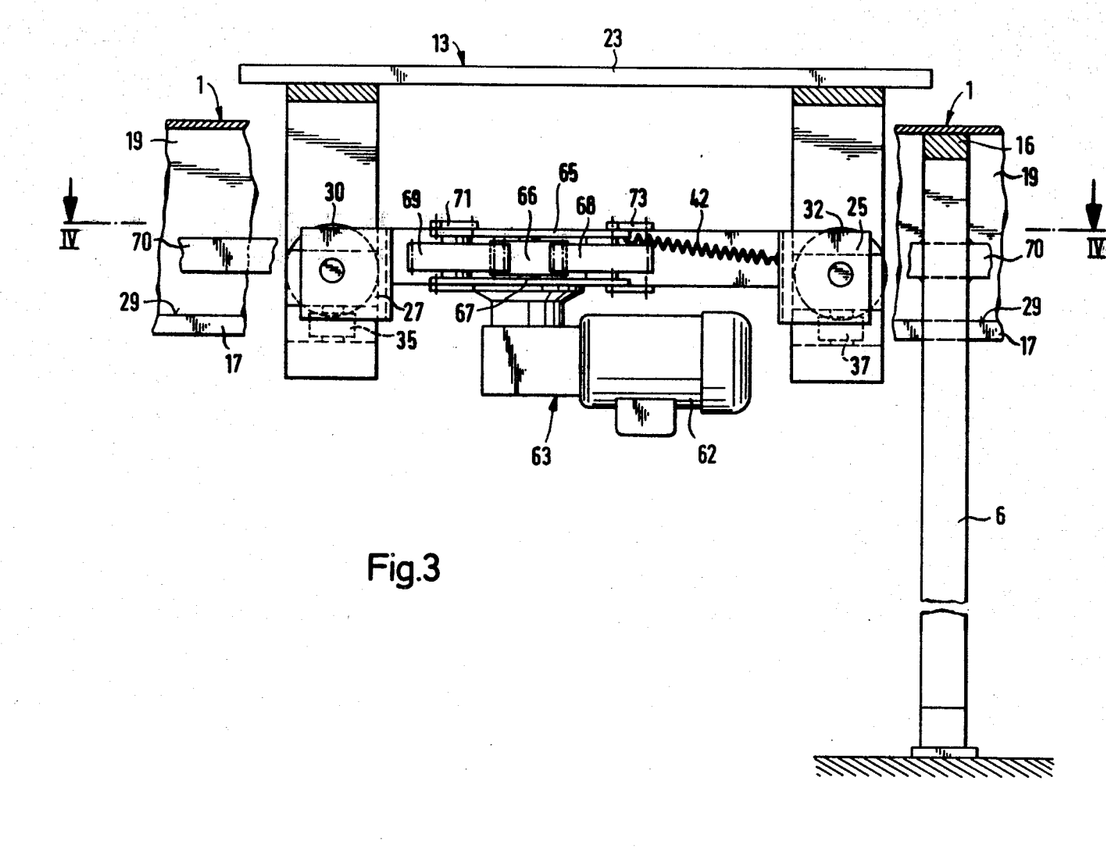
FIG. 3 is fragmentary longitudinal vertical sectional view as seen in the direction of arrows from the line III—III of FIG. 2.
Figure 4:
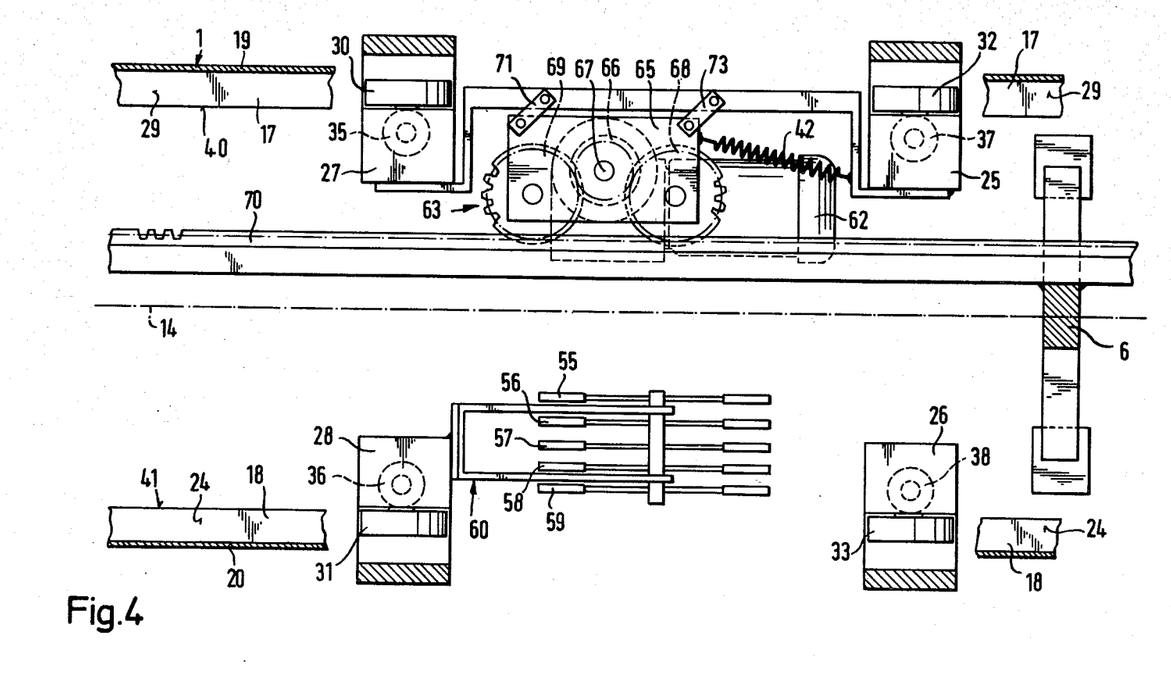
FIG. 4 is a horizontal sectional view as seen in the direction of arrows from the line IV—IV of FIG. 3, with certain parts broken away.

The details of the rail 1, of one (6) of its upright supports, of the conveyance 13 and of means for driving the conveyance are shown in FIGS. 2 to 4.

As explained in connection with FIG. 1, the rail 1 is an inverted U-shaped body having a substantially rectangular cross-sectional outline. It has two halves which are mirror symmetrical to each other with reference to a vertical plane 14 which halves the web 15 and extends lengthwise of the rail. The web 15 is a substantially horizontal plate and the flanges (numbered 19 and 20 in FIGS. 2 to 4) are integral with and extend downwardly from the lateral or marginal portions of the web. The inwardly extending marginal portions at the lower ends of the flanges 19 and 20 are respectively denoted by the reference characters 17 and 18. In the embodiment of FIGS. 2 to 4, the supports (only the support 6 is shown) are secured to the ground or floor G, and their upper end portions 16 constitute crossheads which are adjacent to the underside of the web 15 and extend all the way to the inner sides of the flanges 19 and 20. The crossheads of the supports may be welded or separably connected (e.g., by screws or nuts and bolts) to the web 15.

The upper sides 29 and 24 of the marginal portions 17 and 18 constitute two elongated horizontal tracks for the rollers or wheels 30, 31, 32 and 33 of the conveyance 13.

The inverted U-shaped chassis or frame 21 of the conveyance 13 spacedly surrounds a portion of the rail 1, i.e., it has a top portion which is adjacent to but spaced from the upper side of the web 15 and two downwardly extending lateral portions which are adjacent to but spaced from the outer sides of the flanges 19 and 20. The clearance between the rail 1 and the frame 21 is shown at 22. The cross-section of the frame 21 resembles a rectangle. A platform or table 23 is detachably or permanently mounted on top of the frame 21; this table can carry workpieces or blanks from preceding to the next-following stations in the assembly hall of a manufacturing plant or the like.

The lateral portions of the frame 21 include four substantially U-shaped bearing portions or brackets 25, 26, 27 and 28 each of which extends inwardly below the respective marginal portion 17 or 18 and thereupon upwardly through the inlet 8 of the internal space or interior 8A of the rail 1 to support the respective one of the aforementioned wheels 30 to 33. The bearing portions 25, 27 are adjacent to the flange 19 (see FIG. 4) and the bearing portions 26, 28 (shown in FIG. 4) are adjacent to the flange 20. The wheels 30–33 are mounted on horizontal shafts 28 (indicated by phantom lines) secured to those parts of the respective bearing portions 25 to 28 which extend into the interior 8A of the rail 1. The wheels 30, 32 can roll along the track 29, and the wheels 31, 33 can roll along the track 24.

The wheels 30–33 can be said to form part of a means for centering the frame 21 on the rail 1, i.e., for maintaining the frame 21 out of contact with the adjacent portion of the rail. As can be seen in FIG. 2, the wheels 30–33 (only the wheels 30 and 31 are actually shown) establish those portions of the clearance 22 which extend between the web 15 and the upper portion of the frame 21 on the one hand, and between the undersides of the marginal portions 17, 18 and the adjacent horizontal parts of bearing portions 25 to 28 on the other hand. In order to reduce the extent of lateral wobbling of the frame 21 relative to the rail (i.e., to establish those portions of the clearance 22 which extend between the outer sides of the flanges 19, 20 and the adjacent portions of the frame 21, the bearing portions 25 to 28 respectively carry centering rolls 38, 37, 36, 35 which are rotatable about the axes of vertical or nearly vertical shafts (indicated by phantom lines, as at 34) and roll along the vertical edge faces 40, 41 of marginal portions 17 and 18. FIG. 3 shows that the rolls 35, 37 engage the edge face 40; the other two rolls 36, 38 engage the edge face 41. The centering means including the wheels 30–33 and rolls 35–38 insure that the frame 21 cannot rub against the rail 1, i.e., that, once established, the clearance 22 remains unchanged save for the extent which is attributable to wear.

The heretofore described components of the conveyance form two halves which are mirror symmetrical to each other with reference to the aforementioned plane 14.

The undersides of the crossheads 16 of the supports 6 and 7 carry insulated bus bars 50, 51, 52, 53 and 54 which extend lengthwise of and are located in the interior of the rail 1. These bus bars are connected to the leads of a suitable source of electrical energy (not shown) and are engaged by sliding contacts 55, 56, 57, 58 and 59, respectively. The contacts 55–59 are connected with the components of a control circuit 60 which is located in the interior of the rail 1 and is mounted on one of the bearing portions, e.g., on the bearing portion 28. A cable 61 (a portion of which is indicated in FIG. 1 by a phantom line) connects the outputs of the control circuit 60 with the prime mover 62 (e.g., a reversible electric gear motor) of a driving unit 63 which serves to propel the conveyance 13 lengthwise of the rail 1, either forwardly or backwards. The control circuit 60 and the driving unit 63 are installed in the frame 21 at the opposite sides of the vertical portions of the supports 6 and 7, i.e., at the opposite sides of the symmetry plane 14.

The driving unit 63 further comprises a housing or casing 65 for the motor 62. The vertical output element 67 of the motor 62 carries and drives a gear 66 which meshes with two additional gears 68 and 69. The gears 68 and 69 are mounted in the housing 65 for rotation about vertical axes and are spaced apart from each other, as considered in the longitudinal direction of the rail 1; these gears mesh with an elongated stationary toothed rack 70 which is secured to the vertical portions of the supports 6 and 7 by screws, bolts and nuts or analogous fastener means (denoted in FIG. 2 by a horizontal phantom line 70A). The rack 70 is located in the interior of the rail 1.

The means for articulately connecting the housing 65 to the frame 21 comprises two links 71 and 73 (see FIG. 4) which allow the housing 65 and hence the gears 68, 69 to move toward and away from the teeth of the rack 70. The means for biasing the housing 65 (i.e., the motor 62) toward the rack 70 comprises one or more helical springs 42 which are connected to the housing 65 on the one hand and to the frame 21 on the other hand. Thus, the gears 68 and 69 are permanently biased into mesh with the rack 70. The feature that the rack 70 meshes with two gears (68, 69) which are spaced apart, as considered in the longitudinal direction of the rail 1, is desirable and advantageous because one of the gears remains in mesh with the rack when the other gear is out of contact with the rack, for example, in the gap between the rail 1 and its extension 1B shown in FIG. 1. The directions in which the motor 62 can drive the conveyance 13 lengthwise of the rail 1 are indicated by a double-headed arrow 75 (see FIG. 1). The control circuit 60 can be programmed or is regulated by hand or by remote control to connect the motor 62 with selected bus bars and to thus cause the conveyance 13 to move forwardly or backwards. The motor 62 is preferably provided with an electric, electromagnetic or other suitable brake (not shown) which can be actuated or deactivated via one or more bus bars (50-54) in order to insure that the conveyance comes to a halt with a minimum of delay after the connection between the motor 62 and the energy source is interrupted, or to initiate a braking action while the motor 62 drives the gears 68 and 69. The controls for the just discussed brake are installed at a convenient location so as to be actuated by an operator or by the moving conveyance 13.

It is also within the purview of the invention to provide a common program unit (not shown) for all of the conveyances or for certain groups of conveyances to thereby insure that the conveyances are started, advanced and arrested in a predetermined sequence and remain in motion or at a standstill for preselected intervals of time.

The conveyor can be further equipped with electro-optical or other suitable means (e.g., conventional proximity detectors) which monitor the distance between neighboring conveyances on a rail and automatically brake or arrest the next-following or an oncoming conveyance when the distance between the neighboring conveyances is reduced to a preselected value. The just discussed detector means can also serve to scan the rail 1 and/or the immediately adjacent area for the presence of obstructions which could be damaged by or which could damage the conveyances in the event of collision. The proximity detectors can transmit signals in response to detection of suitable indicia (e.g., protuberances in the form of magnets or the like) which are mounted on or adjacent to the rail 1. Such signals are transmitted to the control circuit 60 which initiates acceleration, deceleration or stoppage of the respective conveyance. As mentioned above, the conveyor can be equipped with a common program unit for all conveyances; in such conveyors, the aforediscussed proximity detectors or other types of detectors will or can transmit signals to the common program unit.

An important advantage of the conveyor of FIGS. 2 to 4 is that it is relatively simple and that all sensitive parts of the rail 1 and/or each conveyance are confined in the interior of the rail so that such parts are protected from liquids, dust or other foreign objects which could interfere with the operation, cause excessive or rapid wear, cause short-circuiting of the conductors and/or cause jamming of the frames 21.

If the conveyor is to be designed in such a way that each conveyance can be mounted thereon in a position corresponding to that of the conveyance 13 shown in FIG. 2 or after inversion of the frame 21 through 180 degrees about a vertical axis, the conveyor will be equipped with a second set of bus bars (at the left-hand side of the symmetry plane 14, as viewed in FIG. 2), and with a second toothed rack 70 which is secured to the other sides of the supports 6 and 7. Such construction is desirable when the conveyor is a rather complex system, e.g., a system which comprises several switches, bypass rails and like components so that a frame which advances along one of the rails in the orientation shown in FIG. 2 is likely to be transferred onto another rail wherein the rack 70 and the bus bars 50-54 are mirror symmetrical with reference to the corresponding parts of FIG. 2. Thus, the versatility of the conveyor can be enhanced by the simple expedient of installing in the interior of the rail two mirror symmetrical racks 70 and two mirror symmetrical sets of bus bars 50-54.

The conveyor is preferably further equipped with disengageable arresting units which can lock the conveyances in selected positions, as considered in the longitudinal direction of the rails. FIG. 2 shows an arresting unit 84 which includes a socket 80 secured to the outer side of one lateral portion of the frame 21 (e.g., close to the table 23) and having a conical cavity or recess 83 for the complementary end portion or tip of a male arresting member or plug 81 which is reciprocable in directions indicated by a double-headed arrow 82. The means for reciprocating the plug 81 may include an electromagnet, a fluid-operated motor (e.g., a double-acting cylinder and piston unit) or any other device which can be actuated by remote control to insure that the plug enters the recess 83 when the frame 21 is to be located and held in a selected position and which withdraws the plug in good time before the motor 62 begins to drive the gears 68 and 69 in order to advance the conveyance 13 along the rail 1.

If the level of the plug 81 is selected in such a way that the upper part of the conical surface of its tip (such upper part is indicated at 81A) begins to bear against the adjacent part (83A) of the conical surface bounding the recess 83 before the tip is fully introduced into the recess, the plug 81 actually lifts the entire conveyance 13 to thereby reduce the pressure between the wheels 30-33 and the corresponding tracks 29, 24, i.e., the frame 21 is then suspended on the tip of the plug 81. In fact, the plug 81 can lift the wheels 30-33 entirely off the tracks 29 and 24. The lifting or pressure-relieving action of the arresting means is further enhanced if such means comprises several units which are disposed in pairs, i.e., if each frame 21 carries two sockets 80 disposed at the opposite sides of the symmetry plane 14. A second arresting unit 85, which is mirror symmetrical to the unit 84, is shown in the upper right-hand portion of FIG. 2. The means for transmitting appropriate signals to the devices which reciprocate the plugs 81 of the arresting units (preferably by remote control) is not specifically shown in the drawing. It is to be noted that, even though the arresting units are advantageous and desirable, they are optional, i.e., they can be dispensed with in many types of conveyors which embody the invention.

Figure 5:
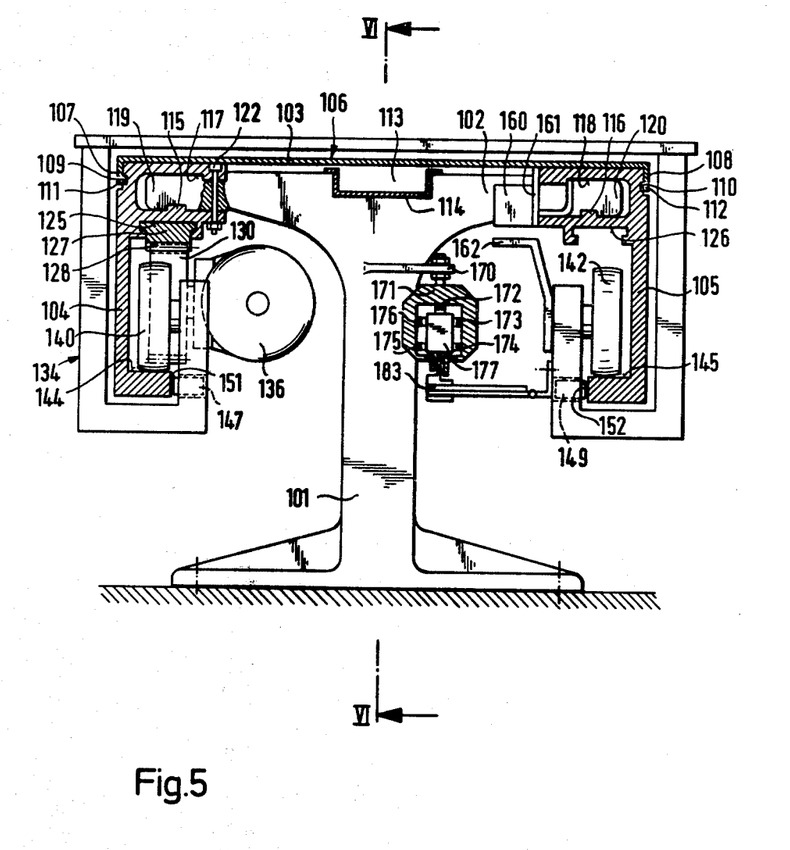
FIG. 5 is a transverse vertical sectional view of a modified monorail conveyor, showing a different rail, different support means for the rail, a modified conveyance on the rail and modified means for driving the conveyance.
Figure 6:
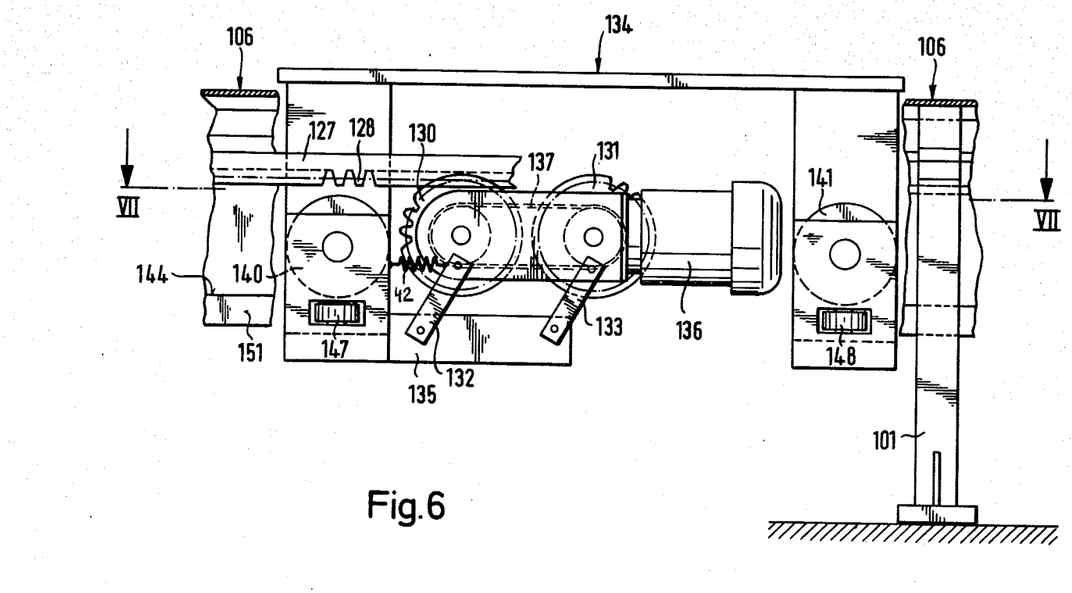
FIG. 6 is a fragmentary longitudinal vertical sectional view as seen in the direction of arrows from the line VI—VI of FIG. 5.
Figure 7:
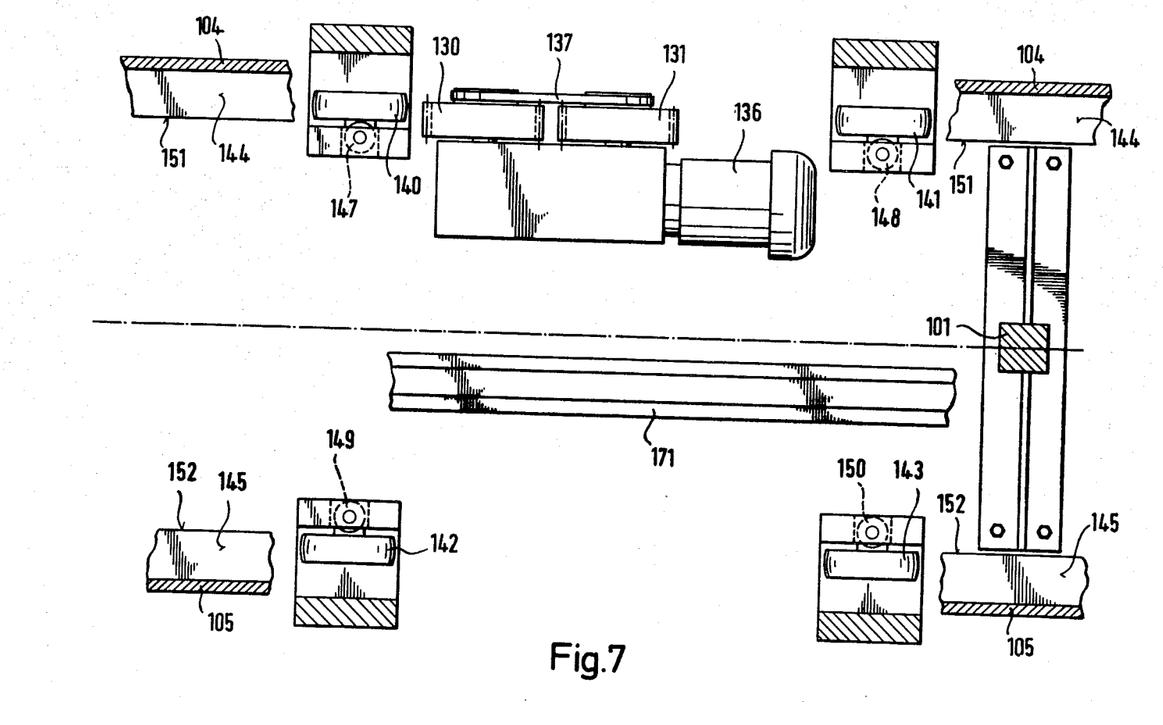
FIG. 7 is a horizontal sectional view as seen in the direction of arrows from the line VII—VII of FIG. 6, with certain parts broken away.

FIGS. 5 to 7 illustrate a modified monorail conveyor. The inverted U-shaped rail 106 of the conveyor is mounted on and secured to several upright supports 101 which are secured to the floor or ground and extend into the interior of the rail, i.e., into the space between the web 103 and the downwardly extending flanges 104, 105. The distance between neighboring supports 101 (only one shown) may be in the range of 3 meters. Each support 101 has an upper end portion 102 which constitutes a crosshead adjacent to the underside of the web 103. The lateral end portions 119, 120 of each crosshead 102 extend all the way to and preferably into suitable longitudinally extending grooves 117, 118 at the inner sides of the respective flanges 104, 105. These grooves extend lengthwise of the rail 106 and are adjacent to the underside of the web 103. The flanges 104, 105 may constitute selfsupporting rigid bodies consisting of extruded aluminum or other suitable metallic material and are mirror symmetrical to each other with reference to a vertical plane denoted by the line IV—IV. These flanges take up the majority of stresses and also support and guide the conveyance 134. Therefore, the web 103 may constitute a relatively thin sheet-metal plate consisting of aluminum or the like, and its marginal portions overlie and are preferably secured to the upper parts of the flanges 104, 105. The lateral or marginal portions 107, 108 of the web 103 extend downwardly along the outer sides of the respective flanges 104, 105 and have longitudinally extending internal protuberances or beads 111, 112 which are received in complementary notches or grooves 109, 110 of the respective flanges 104, 105 by snap action.

The central portion of the upper side of each crosshead 102 is formed with a channel 113 receiving a portion of a U-shaped sheet metal cover 114 which shields one or more electric cables (not specifically shown). The upper side of the channel 113 is overlapped by the adjacent portion of the web 103. The cables and/or other sensitive parts are confined in the channels 113 of the crossheads 102 and are shielded by the web 103 as well as by the U-shaped cover 114. In the embodiment of FIGS. 5 to 7, each channel 113 has a rectangular outline.

The aforementioned longitudinally extending grooves 117, 118 of the flanges 104, 105 are located at a level above inwardly extending longitudinal ribs or partitions 115, 116 of the respective flanges. The undersides of these partitions are respectively formed with additional longitudinally extending grooves 125, 126 one of which receives the upper portion of an elongated toothed rack 127 forming part of means for driving the conveyance 134 along the rail 106. It will be noted that, in contrast to the rack or racks 70 (which is or are secured to the supports for the rail 1), the rack 127 is secured directly to the rail 106, i.e., to one of the flanges 104, 105. It goes without saying that the other groove 126 can also receive a toothed rack so that the conveyance 134 can be driven in the orientation of FIG. 5 as well as after inversion through 180 degrees about a vertical axis.

The configuration of the lateral end portions 119, 120 of the crossheads 102 is preferably such that they fit snugly into the respective grooves 117, 118 and that the rail 106 can be readily shifted lengthwise of the supports 101 upon disengagement of the means which couples the rail 106 to the supports. Thus, the rail 106 can be slipped onto the crossheads 102 of successive supports 101 by moving it lengthwise. The illustrated coupling means for the rail 106 comprises bolts 122 which separably secure the flanges 104, 105 to the crossheads 102 and whose shanks extend through suitable vertical holes in the end portions 119, 120. The means for separably securing the rack 127 to the flange 104 preferably comprises screws, bolts and nuts or analogous simple fasteners.

The teeth 128 of the rack 127 mate with two gears 130, 131 mounted in a housing or casing 135 to rotate about horizontal axes. The gears 130 and 131 are spaced apart from each other, as considered in the longitudinal direction of the rail 106, and the casing 135 is articulately connected to the frame of the conveyance 134 by means of links 132, 133. The casing 135 further supports a reversible electric motor 136 whose output element drives the gear 131. The latter drives the gear 130 through the medium of a belt, toothed belt or chain transmission 137. The spring which biases the gears 130, 131 against the teeth 128 of the rack 127 is shown at 42.

The wheels 140–143 of the frame of the conveyance roll along the tracks 144, 145 which are defined by the inwardly extending lower marginal portions of the flanges 104, 105. The centering rolls 147, 148 and 149, 150 respectively engage the vertical edge faces 151, 152 of the corresponding lower marginal portions. The manner in which the wheels 140–143 and rolls 147–150 are mounted on the bearing members of the frame of the conveyance 134 is the same as or similar to that described in connection with FIGS. 2–4.

Since the supports 101 for the rail 106 are spaced apart, as considered in the longitudinal direction of the rail, large portions of certain grooves (e.g., 117, 118) remain empty when the monorail conveyor of FIGS. 5 to 7 is fully assembled. Such unoccupied portions of these grooves can accommodate proximity detectors (one shown at 160) and/or the holders (161) for such detectors. The detector 160 may be replaced with a conventional switch a portion of which extends all the way into the path of movement of an actuating element or trip 162 which is mounted in and shares the movements of the conveyance 134. It will be noted that the detector 160, its holder 161 and the actuating element 162 are also confined in the interior of and are thus shielded by the rail 106.

The supports 101 further carry suspending devices 170 for an inverted U-shaped casing 171 which extends lengthwise of the rail 106 and contains five bus bars 172, 173, 174, 175 and 176. A support 177 for sliding contacts which engage the respective bus bars 172–176 is located in the space which is surrounded by the bus bars. The support 177 is mounted on a bracket 183 of the conveyance 134 so that it shares the movements of the conveyance along the rail 106 and its sliding contacts supply electrical energy to the motor 136. The exact construction of the control circuit in the frame of the conveyance 134 and/or of a common program unit for several conveyances forms no part of the invention.

An important advantage of the improved conveyor is that the components in the interior of a rail 1 or 106 are highly unlikely to be affected by contaminants in the surrounding atmosphere and/or by obstacles which happen to be placed or fall into the path of movement of a conveyance. As shown, each inverted U-shaped rail confines such components from above, from the sides and in part also from below (note that the inlet 8 to the interior of the rail 1 is narrower than the maximum width of such interior). For example, if the conveyance is intended to transport relatively heavy objects (such as metallic blanks which are to be converted into finished articles in milling, grinding or other types of machines) which rest on the platform 23 or directly on the top portion of the frame of the conveyance 134, such objects are likely to be overturned and to descend from the respective conveyance by gravity. This cannot result in damage to sensitive components of the conveyance because all such components are located in the interior of the rail.

Another important advantage of the improved conveyor is that its component parts are not more expensive, more complex and/or more numerous than the parts of presently known monorail conveyors.

The conveyor can be used in or in combination with production lines in mass-manufacturing plants to serve as a means for transporting workpieces, semifinished and/or finished products from station to station. The paths along which the conveyances travel can be selected practically at will, i.e., the aforediscussed turntables, switches, branches, laterally movable rail sections and similar parts render it possible to direct one or more conveyances into each and every part of an assembly hall or the like, especially since the gears which mesh with the toothed rack are spaced apart from each other so that one thereof remains in engagement with the rack while the other is disengaged from the rack during movement of the corresponding conveyance with a turntable, switch, rail section or the like. The conveyor can be installed indoors or outdoors and can serve for mere transport of parts or for transport and also as a support for parts during removal of material and/or other types of treatment.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A monorail conveyor, comprising an inverted U-shaped rail including a web and two downwardly extending flanges having inwardly extending lower marginal portions; support means for maintaining said rail at a predetermined level above the ground, said support means having upper end portions extending from below into the interior of and being secured to said rail; a conveyance including an inverted U-shaped frame surrounding a portion of said rail and having bearing portions extending below said marginal portions and upwardly into the interior of said rail, and wheels rotatably mounted on said bearing portions in the interior of said rail and engaging said marginal portions; and means for driving said conveyance along said rail.

2. The conveyor of claim 1, wherein said marginal portions have upper sides constituting tracks for said wheels, said wheels being rotatable about substantially horizontal axes.

3. The conveyor of claim 1, further comprising centering means for maintaining said frame out of contact with said rail.

4. The conveyor of claim 3, wherein said marginal portions have substantially vertical edge faces defining an inlet to the interior of said rail and said centering means includes rolls mounted in said bearing portions for rotation about substantially vertical axes and engaging said edge faces.

5. The conveyor of claim 1, wherein said driving means comprises a prime mover mounted on said frame in the interior of said rail, at least one gear driven by said prime mover, and a stationary toothed rack installed in and extending lengthwise of said rail and meshing with said gear.

6. The conveyor of claim 5, further comprising means for biasing said gear into mesh with said rack.

7. The conveyor of claim 5, wherein said driving means comprises a plurality of gears spaced apart from each other, as considered in the longitudinal direction of said rail, each of said gears receiving torque from said prime mover and each thereof meshing with said rack.

8. The conveyor of claim 5, further comprising means for articulately coupling said prime mover to at least one of said bearing portions and means for yieldably biasing said prime mover in a direction to maintain said gear in mesh with said rack.

9. The conveyor of claim 5, wherein said gear is rotatable about a substantially vertical axis and said rack is secured to said support means.

10. The conveyor of claim 1, wherein said upper end portions of said support means include crossheads inwardly adjacent to said web and extending substantially all the way to said flanges.

11. The conveyor of claim 1, wherein said flanges are rigid profiled bodies and are substantially mirror symmetrical to each other with reference to a plane which extends lengthwise of said rail and halves said web.

12. The conveyor of claim 11, wherein said web comprises a plate having lateral portions overlying said flanges.

13. The conveyor of claim 1, wherein said flanges have inner sides provided with grooves extending lengthwise of said rail and said upper end portions of said support means extend into said grooves.

14. The conveyor of claim 13, wherein said grooves are adjacent to said web.

15. The conveyor of claim 13, further comprising means for coupling said upper end portions of said support means to said rail, said rail being movable lengthwise of said upper end portions prior to engagement of said coupling means.

16. The conveyor of claim 1, wherein said driving means comprises a prime mover located in the interior of said rail, at least one gear driven by said prime mover, and a toothed rack located in the interior of and secured to said rail, at least one of said flanges having an inner side provided with a groove extending lengthwise of said rail and said rack being located in said groove.

17. The conveyor of claim 16, further comprising means for securing said rack to said one flange, said rack being movable in said groove lengthwise of said rail prior to application of said securing means.

* * * * *